(12) United States Patent
Starkovich et al.

(10) Patent No.: US 6,610,404 B2
(45) Date of Patent: Aug. 26, 2003

(54) HIGH YIELD STRESS MAGNETORHEOLOGICAL MATERIAL FOR SPACECRAFT APPLICATIONS

(75) Inventors: John A. Starkovich, Redondo Beach, CA (US); Emil M. Shtarkman, Marina Del Rey, CA (US)

(73) Assignee: TRW Inc., Redondo Beach, CA (US)

( * ) Notice: Subject to any disclaimer, the term of this patent is extended or adjusted under 35 U.S.C. 154(b) by 151 days.

(21) Appl. No.: 09/782,472

(22) Filed: Feb. 13, 2001

(65) Prior Publication Data

US 2002/0110704 A1 Aug. 15, 2002

(51) Int. Cl.⁷ .................................................. B32B 5/16
(52) U.S. Cl. ........................ 428/402; 428/402; 428/403; 428/634 BA; 252/62.52; 252/62.54; 188/267; 267/140.14; 267/140.15
(58) Field of Search ................................. 428/402, 403, 428/694 BA; 252/62.52, 62.54; 188/267; 267/140.14, 140.15

(56) References Cited

U.S. PATENT DOCUMENTS

| | | | |
|---|---|---|---|
| 4,869,476 A | 9/1989 | Shtarkman | 267/140.14 |
| 4,896,752 A | 1/1990 | Shtarkman | 188/266.1 |
| 4,942,947 A | 7/1990 | Shtarkman | 188/267.2 |
| 4,992,190 A | 2/1991 | Shtarkman | 252/62.52 |
| 5,167,368 A | 12/1992 | Nash | 239/17 |
| 5,167,850 A | 12/1992 | Shtarkman | 252/62.52 |
| 5,176,368 A | 1/1993 | Shtarkman | 267/140.14 |
| 5,257,681 A | 11/1993 | Shtarkman et al. | 188/267 |
| 5,354,488 A | 10/1994 | Shtarkman et al. | 252/62.56 |
| 5,367,459 A | 11/1994 | Shtarkman et al. | 701/37 |
| 5,382,373 A | 1/1995 | Carlson et al. | 252/62.55 |
| 5,505,880 A | 4/1996 | Kormann et al. | 252/62.54 |
| 5,517,096 A | 5/1996 | Shtarkman et al. | 318/434 |
| 5,578,238 A | 11/1996 | Weiss et al. | 252/62.52 |
| 5,655,757 A | 8/1997 | Starkovich et al. | 267/140.15 |
| 5,667,715 A * | 9/1997 | Foister | 252/62.52 |
| 5,730,531 A | 3/1998 | Pinkos et al. | 384/99 |
| 5,900,184 A * | 5/1999 | Weiss | 252/62.52 |
| 5,921,357 A | 7/1999 | Starkovich et al. | 188/257.2 |
| 5,984,385 A | 11/1999 | Shtarkman et al. | 292/251.5 |

OTHER PUBLICATIONS

J.M. Ginder, L.C. Davis, and L.D. Elie, "Rehology of Magnetorheological Fluids: Models and Measurements", 1996, pp. 504–514.

Mark R. Jolly, J. David Carlson, and Beth C. Munoz, "A Model of the Behaviour of Magnetorheological Materials", Smart Mater, Struct. 5, 1996, pp. 607–614.

* cited by examiner

*Primary Examiner*—Leszek Kiliman
(74) *Attorney, Agent, or Firm*—Harness, Dickey & Pierce, P.L.C.

(57) ABSTRACT

A magnetorheological fluid (32) having controlled-shaped particles (56,68), such as rod, prism, tetrahedral, and other regularly shaped particles. The regularly shaped particles (56, 68) increase the field yield and responsive to particle interaction forces. The magnetorheological material has particular use for space applications such as vibration isolators, vibration dampeners, and latch mechanisms.

21 Claims, 3 Drawing Sheets

HIGH YIELD STRESS MAGNETORHEOLOGICAL MATERIAL FOR SPACECRAFT APPLICATIONS

BACKGROUND

1. Technical Field

The present invention relates generally to magnetorheological materials for use in space applications and, more particularly, to the use of controlled-shaped particles in magnetorheological materials to increase yield-stress of the material.

2. Discussion

Magnetorheological materials are magnetic field responsive materials which are a subdivision of the family of materials known as smart or actively controllable materials. Smart materials use feedback information to dynamically alter the material behavior in order to enhance device and component performance to levels otherwise unachievable using traditional materials and devices.

Magnetorheological materials are particularly unique smart materials because they provide millisecond response time, may be used in both small and large displacement devices, and generate very large forces and torque independent of the velocity of operation. Magnetorheological materials and devices utilizing such materials have been used extensively in earth-based applications. The flexibility and performance has proved useful in vibration isolation systems such as building seismic isolators, mechanical clutches, torque/tension controllers, brakes, damping devices, fluid flow controllers, precision surface shaping/polishing machines, and gripping/latching devices.

Magnetorheological materials, however, have not been thus far particularly attractive for space applications due to size, weight, and power restrictions. For example, for a given magnetic field strength, magnetorheological device size and weight varies approximately between the square and the cubic power of the material yield stress. For example, a doubling or tripling of a material's yield stress results in between a 10–30 times reduction in the device size and weight. Although the doubling and tripling of the magnetorheological property performance appears to be a modest goal, existing formulations for magnetorheological materials do not allow such improvements.

The design of high performance magnetorheological materials for space and other high performance applications necessarily requires high forces between particles at moderate magnetic fields. Existing particles for magnetorheological fluids are typically embodied as spherical particles. Such particles, however, do not provide the requisite packing density and interaction area for yielding the necessary attractive forces between particles at moderate magnetic fields.

Because existing magnetorheological materials do not provide the requisite particle interaction, the basic yield stress properties of components utilizing magnetorheological material devices have been undesirable for space applications because of the desired size, weight, and power requirements that such materials present. Thus it is desirable to provide magnetorheological materials for devices that can be utilized in space applications including actively-controlled launch vibration isolators, large-appendage deployment mechanisms, vibration dampeners for suppression of spacecraft attitude control systems and station keeping operation disturbances, and low-impulse, more accurate release and latch mechanisms.

SUMMARY OF THE INVENTION

The present invention is directed to a magnetorheological medium including a carrier medium and a plurality of magnetizable particles suspended in the carrier medium. The particles are formed in a selected non-spherical shape. The plurality of particles has an inducible interactive force defining an attraction between a selected two of the plurality of particles. When the plurality of particles are subjected to a magnetic field, the particles align to increase the interactive force.

For a more complete understanding of the invention, its objects and advantages, reference should be made to the following specification and to the accompanying drawings.

BRIEF DESCRIPTION OF THE DRAWINGS

The drawings, which form an integral part of the specification, are to be read in conjunction therewith, and like reference numerals are employed to designate identical components in the various views.

DETAILED DESCRIPTION OF THE INVENTION

Figure 1:
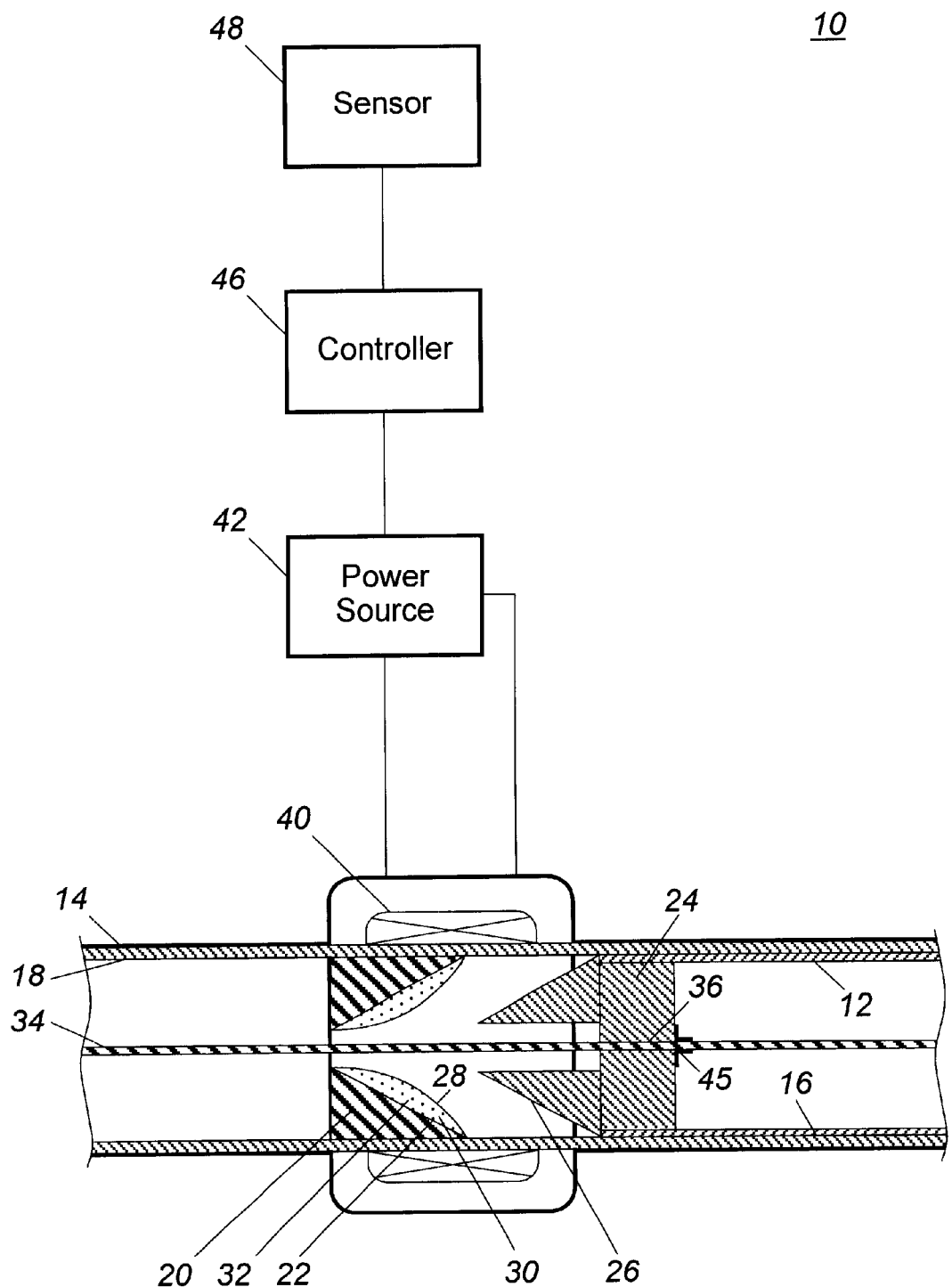
FIG. 1 is a block diagram of a device which utilizes a magnetorheological material in accordance with the principles of the present invention.

FIG. 1 depicts a partial cross-sectional view of a dampener system 10 arranged in accordance with the principles of the present invention, including utilization of the magnetorheological material described herein. It should be noted that the description of magnetorheological material found herein refers to both solid, fluid, or other states of matter having magnetorheological properties. As described herein, dampener system 10 may be used, strictly by way of example, on a latch mechanism or other telescoping structure. However, as will also be discussed herein, dampener system 10 is described strictly by way of example, and the magnetorheological materials discussed herein are used in various vibration isolation, spring dampening, vibration dampening, and release or latch mechanisms.

Dampener system 10 includes an inner tubular member 12, which is disposed and translates within outer tubular member 14. Preferably, an external surface 16 of inner tubular member 12 slides against an inner surface 18 of outer tubular member 14. Attached to outer tubular member 14 is a first engaging member 20 having a first engaging surface 22. First engaging member 20 may be made of a magnetizable material such as iron, nickel, cobalt, or alloys of these materials. First engaging member 20 and first engaging surface 22 provide a stop for a second engaging member 24 having a second engaging surface 26. Second engaging member 24 is also preferably formed of a magnetizable material, such as iron, nickel, cobalt, or alloys of these materials. Preferably, first engaging surface 22 and second engaging surface 26 cooperate so that second engaging surface 26 mates with first engaging surface 22, thereby providing a stop for leftward displacement of inner tubular member 12 with respect to outer tubular member 14.

A flexible bladder 28, preferably made from mylar, is attached to first engaging surface 22 and forms a material chamber 30 between first engaging member 20 and second engaging member 24. A magnetorheological material 32 is supplied to a chamber 30 for either passively or actively dampening shock between first engaging member 20 and second engaging member 24.

A cable 34 extends through outer tubular member 14 and inner tubular member 12 via an axial bore 36 of second engaging member 24. Cable 34 is secured to second engaging member 24 by fastener 45 for moving inner tubular member 12 within outer tubular member 14. Cable 34 also provides a latched mode for dampener system 10 by biasing second engaging member 24 against first engaging member 20 so that second engaging surface 26 interferes with first engaging surface 22.

A source of magnetic field, such as an electromagnet 40 is coupled to the exterior of the outer tubular member 14 in proximity to magnetorheological material chamber 30. Electromagnet 40 is disposed for selectively providing a magnetic field across magnetorheological material 32. A power source 42 interconnects to electromagnet 40 to selectively energize electromagnet 40, thereby providing a magnetic field across magnetorheological material 32. Power source 42 is actuated by control signals received from controller 46. Controller 46 receives an input signal from a sensor 48 which detects a sensed parameter, such as oscillation, vibration, or other parameter relevant to determining a desired output from power source 42.

A particular feature of the present invention is the use of magnetorheological material formulations using regular and irregular, non-spherical particles. More particularly, disk, rod, cube, prismatic, tetrahedral, and hemispherical shaped particles may be used in order to provide increased performance of the magnetorheological fluid 32 of FIG. 1. Utilizing regular, non-spherical particles enables larger interaction contact areas, improved field homogeneity and density, and greater particle packing densities. The shape of the controlled-shaped particles may be any prism shape, such as a triangle, rectangle, cube, or other regular and irregular polygon shape. In fact, regular or irregular particle shapes may be used. The improvements upon these properties can substantially increase both the number and strength of particle interactions.

Figure 2:
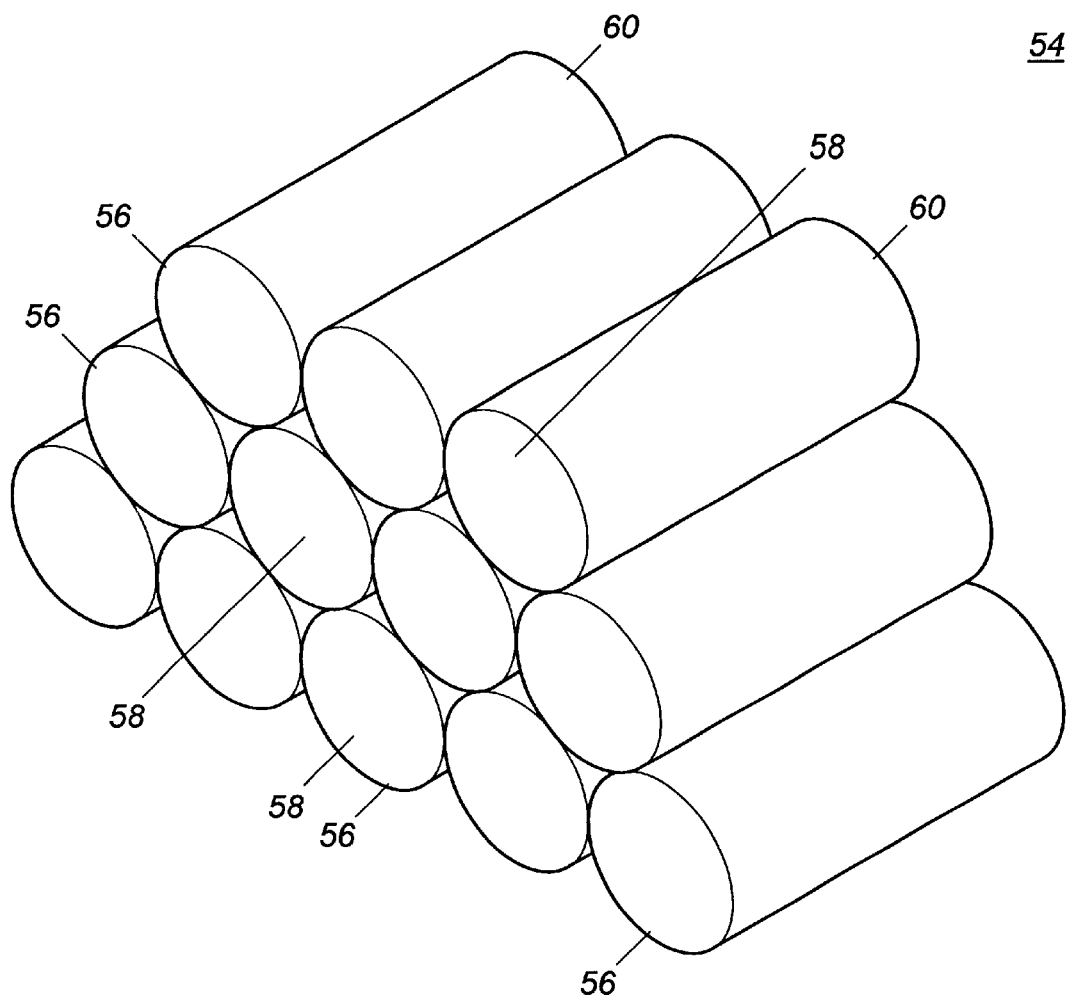
FIG. 2 shows controlled-shaped particles for a magnetorheological material formed in a cylindrical configuration.

FIG. 2 depicts a particle assembly 54, which may be formed using a magnetorheological material having controlled-shaped, ferromagnetic or other magnetizable particles as described herein. Particle assembly 54 includes a plurality of cylindrically shaped particles 56, which cooperate to form particle assembly 54. Particles 56 may be relatively short cylinders, defining thin disks. Shaped particles 56 may alternatively be shaped as hollow rods, solid tubes, or hollow tubes. Particles 56 may include a single ferromagnetic substrate or be a composite material in which the substrate particle may be a non-magnetizable material coated with or containing a ferromagnetic material. Substrate 58 may be comprised of carbon, ceramic, glass, drawn metals, such as aluminum, gold wire, polymer fibers, or polymer fibrils. Substrate 58 is coated with a coating 60, which includes a magnetizable material, such as but not limited to iron, nickel, cobalt, gadolinium, neodymium, samarium, terbium, dysprosium, or mixtures and alloys of these materials.

The coating 60 may be deposited upon substrate 58 through a vapor deposition process, which is known in the art. Such vapor deposition may occur using an iron and cobalt carbonyl based process. Alternatively, electrodeposition may be used as an alternative to the above-described vapor deposition process. While the fabrication of particles 56 described herein discusses the use of substrate 58 and a coating 60, one skilled in the art will recognize that a cylindrical, or any other non-spherically shaped, particle which can be formed of a magnetizable material, may be substituted in the present invention. Such a particle would thus eliminate the need for coated substrates. In the particle assembly 54 of FIG. 2, a theoretical packing density ($\Delta$) is approximately 0.93.

Figure 3:
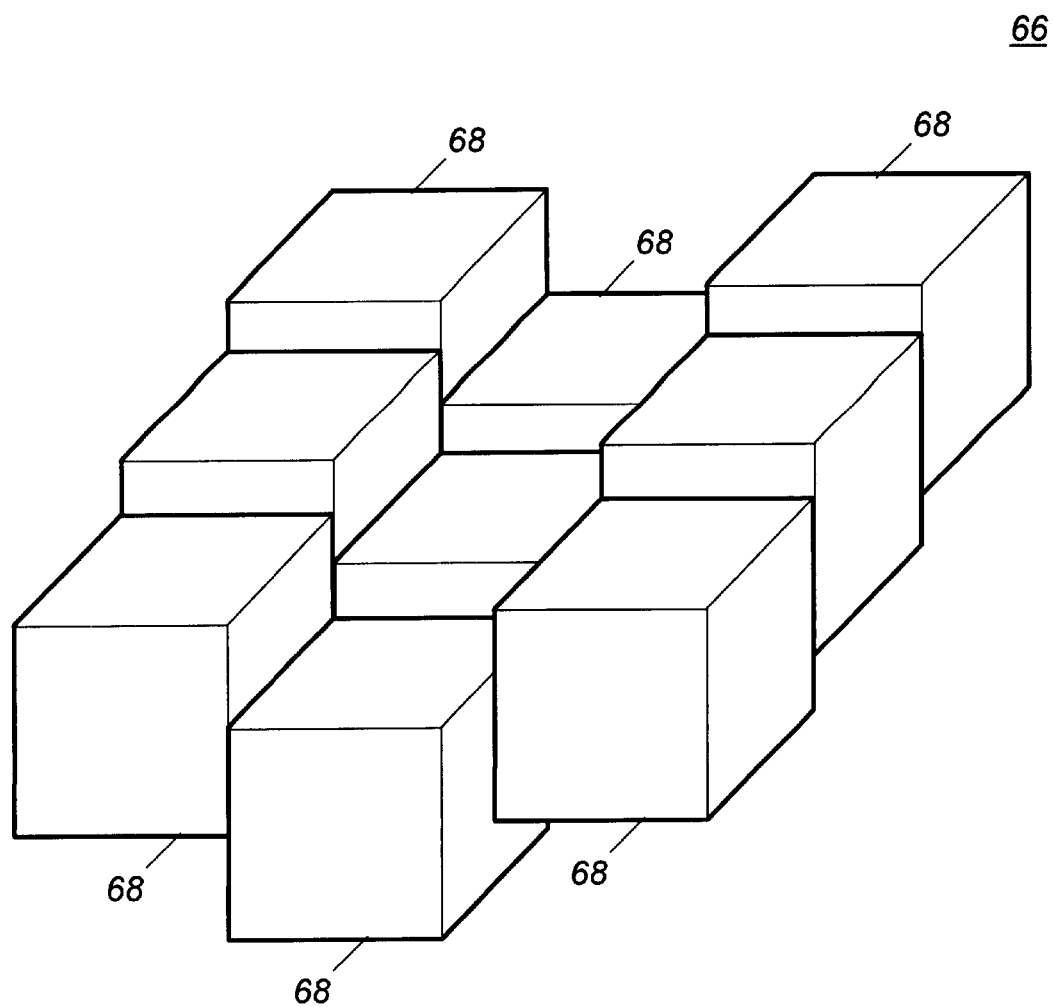
FIG. 3 shows controlled-shaped particles for magnetorheological material particles arranged in a cubic or prismatic shape.

FIG. 3 depicts an alternative configuration of the particles of magnetorheological material. In particular, FIG. 3 depicts a particle assembly 66 in which the individual particles 68 are formed in a cubic shape. Particles 68 may be formed in triangular, rectangular, cubic, regular and irregular polygon, and various other shapes. The individual particles 68 may be formed as described above with respect to FIG. 2 and may include a substrate upon which is deposited a coating having magnetizable material such as but not limited to iron, nickel, cobalt, gadolinium, neodymium, samarium, terbium, dysprosium, or mixtures and alloys of these materials. The particle assembly 66 of FIG. 3 has a theoretical density ($\Delta$) of 1.0.

By way of comparison, the magnetorheological material 32 generates forces which are proportional to yield stress and which are 17 times greater than conventional, spherical particles in a magnetorheological fluid. Likewise, the forces which are proportional to the yield stress of a magnetorheological fluid having cubic particles provide a 170 times increase over conventional, spherical particles and a 10 times increase over cylindrical particles. Further, one skilled in the art will recognize that the particles described herein may be combined in various ways to define alternative particle assemblies.

While the invention has been described in its presently preferred form, it is to be understood that there are numerous applications and implementations for the present invention. Accordingly, the invention is capable of modification and changes without departing from the spirit of the invention as set forth in the appended claims.

What is claimed is:

1. A magnetorheological material comprising:
   a carder medium; and
   a plurality of magnetizable particles suspended in the carrier medium, the particles being of a selected non-spherical shape having at least two surfaces, the plurality of particles having an inducible interactive force defining an attraction between at least two of the plurality of particles, where the attraction occurs at two or more points along adjacent surfaces of said at least two particles, wherein when the plurality of particles are subjected to a magnetic field, the particles align to increase the interactive force.

2. The material of claim 1 wherein the plurality of magnetizable particles comprises:
   a substrate formed to the selected shape; and
   a magnetizable coating disposed on the particles.

3. The material of claim 2 wherein the plurality of particles are formed in a shape selected from the group consisting of cylindrical, disk, rod, tube, and hemispherical shapes.

4. The material of claim 2 wherein the plurality of particles are formed in shapes selected from the group of cubic, prismatic, and regular and irregular polygonal shapes.

5. The material of claim 2 wherein the plurality of magnetizable particles further comprises:
   a substrate formed of one of the group consisting of carbon, metal, ceramic, glass, polymer fibers, and polymer fibrils, and wherein the magnetizable coating comprises one of the group consisting of iron, cobalt, nickel, gadolinium, samarium, neodymium, terbium, dysprosium, and mixtures and alloys of iron, cobalt, nickel gadolinium, samarium, neodymium, terbium, and dysprosium.

6. The material of claim 2 wherein the magnetizable coating comprises one of the group consisting of iron, cobalt, nickel, gadolinium, samarium, neodymium, terbium, dysprosium and mixtures and alloys of iron, cobalt, nickel gadolinium, samarium, neodymium, terbium, dysprosium, and magnetite.

7. An apparatus comprising:
   a first member;
   a second member which moves relative to the first member;
   a material interposed between the first and second member, the material being a magnetorheological material having particles being of a non-spherical shape having at least two surface; and
   a magnetic field source, the magnetic field source selectively generating a magnetic field that permeates the material, wherein upon activation of the magnetic field source, the particles magnetically interact, such that an attraction occurs between the particles at two or more points along adjacent surfaces of the particles, thereby varying movement of the first member with respect to the second member.

8. The apparatus of claim 7 wherein the particles are formed in a shape selected from the group consisting of cylindrical, disk, rod, tube, and hemispherical shapes.

9. The apparatus of claim 7 wherein the particles are formed in a shape selected from the group of cubic, prismatic, and regular and irregular polygonal shapes.

10. The apparatus of claim 7 wherein the magnetic field source generates a variable magnetic field and wherein the interaction between the particles varies in accordance with a magnitude of the magnetic field.

11. The apparatus of claim 7 wherein varying the magnetic field varies at least one of vibration, dampening, and spring rate between the first and second members.

12. An apparatus comprising:
    a first member;
    a second member which moves relative to the first member;
    a material interposed between the first and second member, the material being a magnetorheological material having particles being one of a non-spherical shape having at least two surfaces; and
    a magnetic field source, the magnetic field source selectively generating a magnetic field that permeates the material, wherein the magnetic field source generates a variable magnetic field and wherein the Interaction between the particles varies in accordance with a magnitude of the magnetic field, wherein upon activation of the magnetic field source, the particles magnetically interact, such that an attraction occurs between the particles at two or more points along adjacent surfaces of the particles, thereby varying movement of the first member with respect to the second member.

13. The apparatus of claim 12 wherein varying the magnetic field varies at least one of vibration, dampening, and spring rate between the first and second members.

14. The apparatus of claim 12 wherein the magnetorheological material comprises:
    a carrier medium; and
    a plurality of magnetizable particles suspended in the carrier medium, wherein the plurality of magnetizable particles have an inducible interactive force defining an attraction between a selected two of the plurality of particles,
    wherein when the plurality of particles are subjected to a magnetic field, the particles align to increase the interactive force.

15. The apparatus of claim 14 wherein the plurality of particles are formed in a shape selected from the group consisting of cylindrical, disk, rod, tube, and hemispherical shapes.

16. The apparatus of claim 14 wherein the plurality of particles are formed in a shape selected from the group of cubic, prismatic, and regular and irregular polygonal shapes.

17. The apparatus of claim 14 wherein the plurality of magnetizable particles comprises:
    a substrate formed to the selected shape; and
    a magnetizable coating disposed on the particles.

18. The apparatus of claim 15 wherein the plurality of particles further comprises:
    a substrate formed by one of the group consisting of carbon, metal, ceramic, glass, polymer fibers, and polymer fibrils, and
    wherein the magnetizable coating comprises one of the group consisting of gadolinium, samarium, neodymium, terbium, and magnetic dysprosium.

19. The apparatus of claim 15 wherein the magnetizable coating comprises one of the group consisting of gadolinium, samarium, neodymium, terbium, and magnetic dysprosium.

20. A magnetorheological material comprising:
    a carrier medium; and
    a plurality of magnetizable particles suspended in the carrier medium, the particles being of a cylindrical shape, the plurality of particles having an inducible interactive force defining an attraction between at least two of the plurality of particles, wherein when the plurality of particles are subjected to a magnetic field, the particles align to increase the interactive force.

21. A magnetorheological material comprising:
    a carrier medium; and
    a plurality of magnetizable particles suspended in the carrier medium, the particles being of a cubic shape, the plurality of particles having an inducible interactive force defining an attraction between at least two of the plurality of particles, wherein when the plurality of particles are subjected to a magnetic field, the particles align to increase the interactive force.

* * * * *